United States Patent
Gieseke

(10) Patent No.: US 8,655,894 B2
(45) Date of Patent: Feb. 18, 2014

(54) METHOD AND APPARATUS FOR INDEX GENERATION AND USE

(75) Inventor: Eric James Gieseke, Lincoln, MA (US)

(73) Assignee: Nokia Corporation, Espoo (FI)

(*) Notice: Subject to any disclaimer, the term of this patent is extended or adjusted under 35 U.S.C. 154(b) by 319 days.

(21) Appl. No.: 12/767,457

(22) Filed: Apr. 26, 2010

(65) Prior Publication Data

US 2011/0264666 A1 Oct. 27, 2011

(51) Int. Cl.
*G06F 17/30* (2006.01)
*G06F 17/00* (2006.01)

(52) U.S. Cl.
USPC ........... 707/755; 707/756; 707/790; 707/791; 707/792; 707/793; 707/794; 707/795; 707/796; 707/802; 707/803; 707/809

(58) Field of Classification Search
USPC .......... 707/755, 756, 790–796, 802, 803, 809
See application file for complete search history.

(56) References Cited

U.S. PATENT DOCUMENTS

| | | | | |
|---|---|---|---|---|
| 5,201,046 A * | 4/1993 | Goldberg et al. | | 1/1 |
| 5,295,261 A * | 3/1994 | Simonetti | | 1/1 |
| 6,085,197 A | 7/2000 | Federighi et al. | | |
| 6,163,776 A * | 12/2000 | Periwal | | 1/1 |
| 6,366,934 B1 * | 4/2002 | Cheng et al. | | 715/210 |
| 6,591,272 B1 | 7/2003 | Williams | | |
| 7,024,425 B2 * | 4/2006 | Krishnaprasad et al. | | 1/1 |
| 7,366,708 B2 * | 4/2008 | Jalali et al. | | 707/741 |
| 7,493,335 B2 * | 2/2009 | Gold et al. | | 1/1 |
| 7,634,498 B2 * | 12/2009 | Pal et al. | | 1/1 |
| 7,650,357 B2 * | 1/2010 | Lin et al. | | 707/999.102 |
| 7,664,778 B2 * | 2/2010 | Yagoub et al. | | 707/758 |
| 7,698,294 B2 | 4/2010 | Ma et al. | | |
| 7,802,180 B2 * | 9/2010 | Warner et al. | | 715/234 |
| 2004/0078355 A1 | 4/2004 | Suresh | | |
| 2006/0149712 A1 | 7/2006 | Kindsvogel et al. | | |
| 2006/0271390 A1 | 11/2006 | Rich et al. | | |
| 2010/0082646 A1 | 4/2010 | Meek et al. | | |

FOREIGN PATENT DOCUMENTS

EP 1 677 209 A1 7/2006

OTHER PUBLICATIONS

International Search Report for PCT Application No. PCT/FI2011/050283, Sep. 22, 2011, pp. 1-7.
Written Opinion for PCT Application No. PCT/FI2011/050283, Sep. 22, 2011, pp. 1-8.

\* cited by examiner

*Primary Examiner* — Yicun Wu
(74) *Attorney, Agent, or Firm* — Ditthavong Mori & Steiner, P.C.

(57) ABSTRACT

An approach is provided for generating a searchable index including an associated object graph. Data objects of a database are converted into corresponding rows in a set of searchable columns. An object graph corresponding to each row of the searchable columns are determined. An index including the set of searchable columns and the corresponding object graphs are generated.

20 Claims, 8 Drawing Sheets

METHOD AND APPARATUS FOR INDEX GENERATION AND USE

BACKGROUND

Service providers and device manufacturers (e.g., wireless, cellular, etc.) are continually challenged to deliver value and convenience to consumers by, for example, providing compelling network services. Important differentiators in the industry are application and network services as well as capabilities to support and scale these services. In particular, these applications and services can include accessing and managing data utilized, for example, by online store services. In the past, these services have utilized different types of persistent storage to facilitate viewing, searching, and changing information. The functions of such a persistent storage can include Create, Read, Update, and Delete (CRUD). With this functionality, many of these persistent stores include basic retrieval features, but lack rapid search and access. Service providers that use such persistent storage thus face significant challenges in optimizing search and access to persistent storage.

SOME EXAMPLE EMBODIMENTS

Therefore, there is a need for an approach for generating a searchable index with an attached object graph. The searchable index can be developed based on a database that uses an object relational mapping.

According to one embodiment, a method comprises converting a plurality of data objects of a database to corresponding rows in a set of searchable columns. The method also comprises determining an object graph corresponding to each row of the searchable columns. The method further comprises generating an index including the set of searchable columns and the corresponding object graphs.

According to another embodiment, an apparatus comprising at least one processor, and at least one memory including computer program code, the at least one memory and the computer program code configured to, with the at least one processor, cause, at least in part, the apparatus to convert a plurality of data objects of a database to corresponding rows in a set of searchable columns. The apparatus is also caused to determine an object graph corresponding to each row of the searchable columns. The apparatus is further caused to generate an index including the set of searchable columns and the corresponding object graphs.

According to another embodiment, a computer-readable storage medium carrying one or more sequences of one or more instructions which, when executed by one or more processors, cause, at least in part, an apparatus to convert a plurality of data objects of a database to corresponding rows in a set of searchable columns. The apparatus is also caused to determine an object graph corresponding to each row of the searchable columns. The apparatus is further caused to generate an index including the set of searchable columns and the corresponding object graphs.

According to another embodiment, an apparatus comprises means for converting a plurality of data objects of a database to corresponding rows in a set of searchable columns. The apparatus also comprises means for determining an object graph corresponding to each row of the searchable columns. The apparatus further comprises means for generating an index including the set of searchable columns and the corresponding object graphs.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating a searchable index with an attached object graph are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
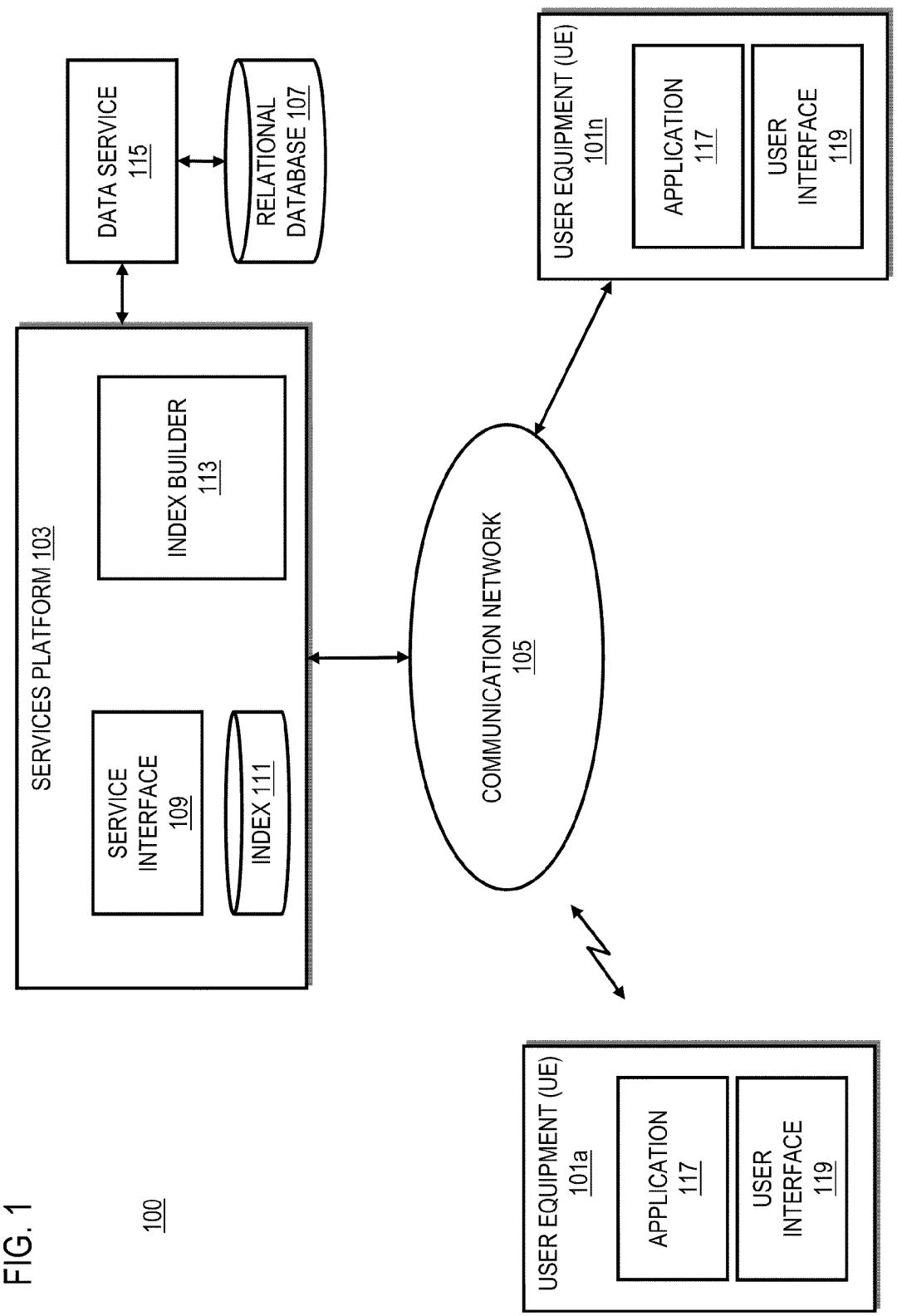
FIG. 1 is a diagram of a system capable of generating a searchable index with an attached object graph, according to one embodiment.

FIG. 1 is a diagram of a system capable of generating a searchable index with an attached object graph, according to one embodiment. With increasing demand for network services, the need to properly manage data searching and transfer is of paramount concern. An integral part of any network service is storing and retrieving data from a database. In certain embodiments, a database is a collection of data organized into tables of rows and/or columns. In certain embodiments, a row and a column can be used interchangeably in providing a relationship between data. The tables can provide a manner to access, manage, and update data associated with the tables.

One type of database is a flat database. A flat database includes a table of data. In this manner, a database can populate a record (e.g., a row) of data corresponding to fields of one or more columns. One example of a flat database is a database for taking orders. In this database, a record is created for each new order received. Each record can have fields that correspond to columns of information. Because there is a single table, fields for customer information such as name and address are stored with the record as well as product information such as product name, quantity of the order, price for the product, an extended price, etc. Additionally, if the same customer places another order, another record is created with the customer information (which may be the same as the previous record) as well as the customized product information. Using this approach, the customer information is duplicated each time an order is received. As duplicate data is received for each record, inconsistencies may arise (e.g., the customer uses a first name and last name in one entry and a nickname and last name in another entry). As such, when a user (e.g., a representative of the company taking the order, the customer, etc.) queries the database, some of the records that the user desires to obtain may not be returned in a result. Further, if the user changes one or more fields of customer information (e.g., a billing address), each record associated with the customer would need to be found and then updated. As noted previously, inconsistencies in the records can result in some of these records that should be updated not being updated. Throughout the Specification examples of various tables and databases are used. These examples are exemplary are not meant to limit the patent in any way.

Another type of database is a relational database. A relational database matches data by using common characteristics of a data set. Thus, a relational database can include multiple tables of data that relate to each other through one or more fields. For example, the relational database can store the same information as the flat database using two tables, an orders table and a customer information table. Each customer can have a set of information (e.g., name, address, credit card number, etc.) in the customer information table. Further, each customer information record can include a unique customer code that serves as a relational key. When the system receives an order from the customer, the record in the orders table includes the relational key. With this approach, when an update needs to be made, the system need only make one update to the customer information table and it can affect all orders. In certain embodiments, more than one set of information may be used for the customer information (e.g., one set for a home address, another set for a vacation home, another set for the user's parents' home, etc.). Each of these sets may further be associated via relational keys. The above includes a simple version of a relational database, however, in practice, multiple relationships and tables can be provided for the relational database. In one example, a real-estate transaction database includes real-estate transaction data for a town. The real-estate transactions can be grouped by the year of the transaction, sale price of the transaction, buyer's last name, postal address, plot, etc. As such, relationships can be made between each of these sets of information. As relationships become more and more complex, searching these databases using a textual search becomes more and more complex. This is because a separate search may need to be generated to search each of the tables. The separate searches can be time consuming, requiring the user of the database (e.g., via client) to wait.

Although various embodiments are described with respect to relational databases, it is contemplated that the approach described herein may be used with other persistent storage. For example, a Resource Description Framework (RDF) storage engine or other types of persistent stores such as object oriented databases may be utilized. In one example, a RDF engine can store RDF data in a native representation of a triple store or quad store. These stores can be optimized based on the RDF format to form subject-predicate-object relationships (e.g., a triple) to form statements. For example, the term "Smith knows Robert" can be parsed into the subject "Smith," the predicate "knows," and the object "Robert" and then represented as a triple. In the case of a quad store, the statement may include four terms instead of the three terms in a triple.

To address the problem described above, a system 100 of FIG. 1 introduces the capability to generate a searchable index of a relational database with an attached object graph. The searchable index can be geared towards a specific use case optimised for searching for particular information stored in the relational database. Further, the object graph can preserve the structured information in the relationship database. In this manner, a user of user equipment (UEs) 101a-101n can query a services platform 103 via a communication network 105 for information stored in the relational database 107 to receive a returned search result for the query. A service interface 109 of the services platform 103 searches an index 111 generated by an index builder 113.

The index builder 113 generates the index 111 from the relational database 107 and/or corresponding data service 115 in charge of managing the relational database 107. The index builder 113 receives data objects (e.g., one or more tables) from the relational database 107 via the data service 115. In certain embodiments, a data object is a table or an instance of a table stored in the relational database 107. Further, a data object can include partial tables and/or instances of tables. Then, the index builder 113 converts the data objects of the database to corresponding rows in a set of searchable columns of an index. Each row of the index 111 can include searchable data (e.g., text corresponding to one or more fields) associated with a record of one of the tables of the relational database 107. Further, the index row can include searchable data associated with the record from multiple tables associated with the record via one or more relationships. For example, the relational database 107 includes a table for each of product variants, products, publishers, device types, countries, language, and digital assets. Each of these tables can be linked to each other via one or more relationship keys. Thus, if an index 111 is made based on a product variant, an identifier for the product variant can be used to retrieve associated data from the other tables to add to the index row content. In certain embodiments, one searchable index field corresponds to a table of the relational database 107. In other embodiments, one searchable index column corresponds to a field of each table. Different variations and combinations of formatting the index 111 can be used based on circumstances. In certain embodiments, the searchable columns are formatted to be basic and include text. In this manner, the index 111 can be used to provide information to one or more UEs 101 using different applications 117. These applications 117 can further be coded in different programming languages (e.g., Java, JavaScript, Perl, Hypertext Preprocessor (PHP), etc.). Thus, the index 111 may be language independent.

Further, the index builder 113 determines an object graph associated with the row of the index 111. The object graph can be based on a selected table used for generating the index 111 (e.g., the product variant table in the above mentioned example). The object graph can be determined by determining one or more relationships between the data object corresponding to the row and one or more other data objects in the relational database 107. This determination can be made by searching one or more of the other tables for one or more relationship keys associated with the data object. The object graph corresponding to each data graph thus includes a representation of relationships to the other corresponding data objects. In certain embodiments, the object graph is encoded in a markup language such as Extensible Markup Language (XML) or another language such as JavaScript Object Notation (JSON). Further, the object graph can be serialized and/or compressed. One feature of the system 100 is to allow for rapid access to the relational database 107 while maintaining structure and saving memory space. As such, the system 100 can include means for generating the searchable columns and/or object graphs.

Thus, the index builder 113 generates the index 111. The index 111 can include, for each row, one or more searchable columns and a corresponding object graph. In this manner, a text search can be performed on the index 111 to retrieve a row. The row includes the searchable data as well as the object graph. The searchable data and/or the object graph are then caused to be transmitted to the UE 101 as a response to the query. In certain scenarios, the response to the query can include one or more rows that match or match, at least in part, the search query.

By way of example, an application 117 (e.g., a web browser, a database manager, etc.) that requested the query receives the results. The results are then presented to the user via a user interface 119. Further, the application 117 can decompress the object graph and/or deserialize the object graph. In certain embodiments, the object graph is fully populated and includes the information that was searched. In other embodiments, the object graph includes structural information that is used to provide structure to one or more columns of the row. Further, the user may manipulate one or more of the fields in the object graph (e.g., an address field associated with a customer table). Because the structure is maintained, an update can be sent to the services platform 103 to update the relational database 107 based on the changes.

When the data service 115 receives a request to update the relational database 107 and/or periodically, the data service 115 can send a request to the index builder 113 to begin update of an associated index 111. As such, the index builder 113, based on the request or periodically, can update the indexes 111. The index builder 113 can determine that a change has occurred in the relational database 107 based on an interrupt the request. Then, the index builder 113 updates the index 111 based on the change. In certain embodiments, an entire row is replace, in other embodiments, one or more fields and/or the object graph is replaced based on the changes to the relational database 107. For example, if there is a change to the information associated with the data object corresponding to a particular table that also corresponds to one or more columns, only those columns and/or the object graph need to be updated.

In certain embodiments, the index 111 is a Lucene index implemented using Apache Lucene. Lucene is a retrieval software library. Lucene is widely used for its full text searching and indexing capabilities. In a Lucene index, textual information is extracted from original data objects (e.g., documents). This allows for a full text search using the index. Lucene indexing is one possible technology to implement indexing and searching of the relational database 107. Other methods of full text searching and/or indexing can additionally be utilized.

In one example, XML is used to describe the object graph. XML is a set of encoding rules to electronically encode documents. In addition to XML, it is contemplated that encoding using other languages or schemes (e.g., JSON) can be utilized to generate the object graph. By way of example, one or more XML language features (e.g., tags, elements, markup, content, etc.) can be utilized to describe the object graph and/or index 111. Further, XML may be utilized to describe one or more indexes 111 built by the index builder 113. As such, when a service interface 109 searches the index 111 according to a query from a UE 101, the service interface 109 may utilize efficiencies of parsing XML documents as indexes 111 and index definitions.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

The user interface 119 can include various methods of communication. For example, the user interface 119 can have outputs including a visual component (e.g., a screen), an audio component, a physical component (e.g., vibrations), and other methods of communication. User inputs can include a touch-screen interface, a scroll-and-click interface, a button interface, a microphone, etc.

By way of example, the UE 101, services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the services platform 103 may interact according to a client-server model with applications 117 on UEs 101. According to the client-server model, a client process sends a message including a request to a server process (e.g., a query for information), and the server process responds by providing a service (e.g., providing the requested information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
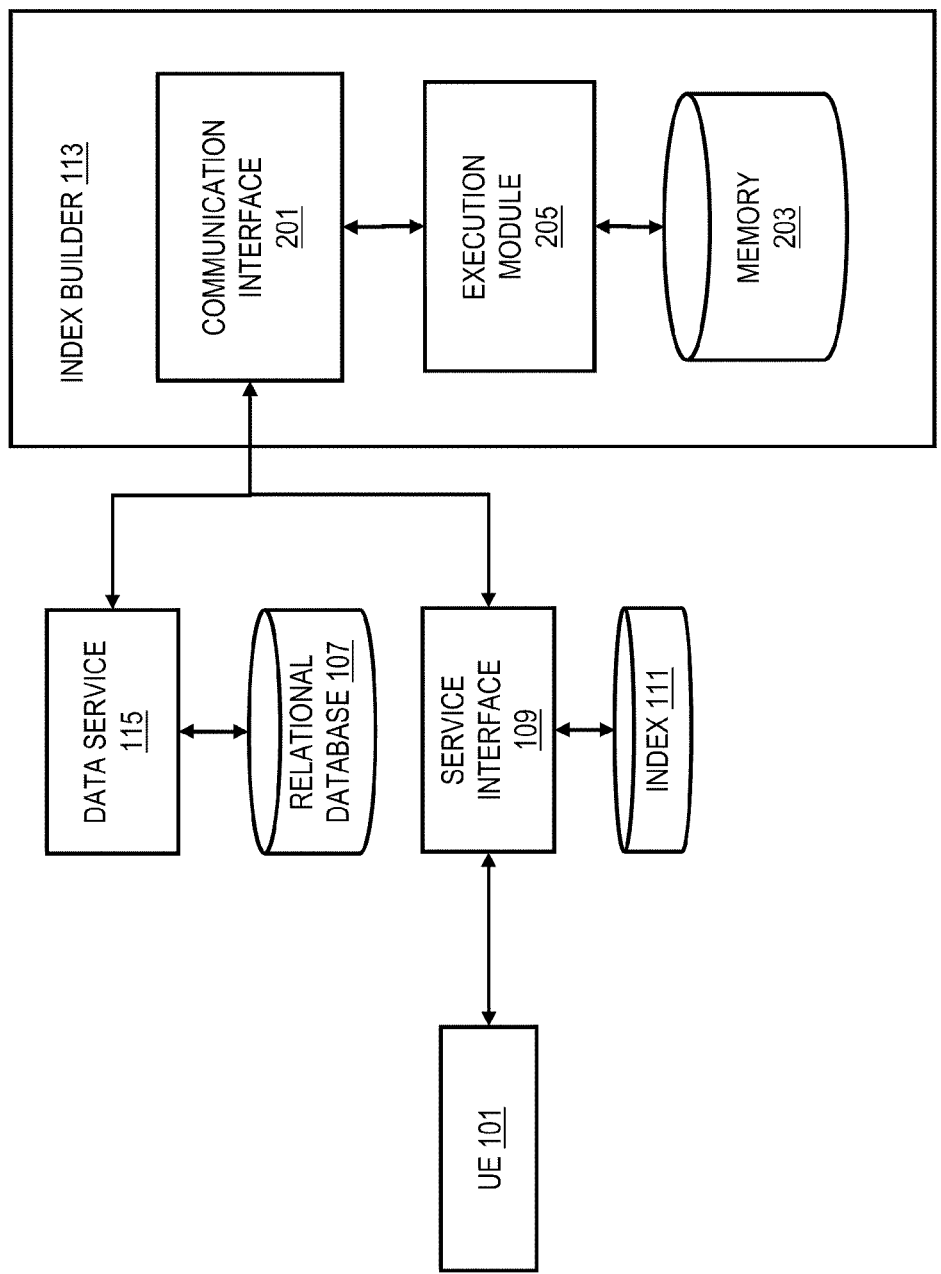
FIG. 2 is a diagram of the components of an index builder, according to one embodiment.

FIG. 2 is a diagram of the components of an index builder, according to one embodiment. By way of example, the index builder 113 includes one or more components for providing generating and updating a searchable index 111 based on a relational database 107. It is contemplated that the functions of these components may be combined in one or more components or performed by other components of equivalent functionality. In this embodiment, the index builder 113 includes at least one communication interface 201, at least one memory 203, and an execution module 205.

The communication interface 201 can be used to communicate with the data service 115, service interface 109, UEs 101 via the service interface, and other devices available over the communication network 105 or associated with the services platform 103. In certain embodiments, the services platform 103 represents a cloud or set of servers. The execution module 205 can receive information (e.g., database tables) from the data service 115 via the communication interface 201 via methods such as internet protocol, fiber optic transmission, or any other available communication method. Further, the communication interface 201 can be used to populate the index 111 (e.g., via the service interface 109 and/or directly). Components in the communication network 105 and/or communication interface 201 may be utilized to convert one form of communication to another form of data transmission.

The execution module 205 can further receive the data objects from the data service 115. The data objects can be received by request and/or as a part of a periodic process. Further, the execution module 205 can generate an index 111 based on one or more data objects. While generating the index, index information can be stored in the memory 203. Moreover, when the index is generated, the index can be stored in a memory associated with the service interface 109. Additionally or alternatively, the execution module 205 can receive data objects from the data service 115 to update one or more indexes.

Further, the service interface 109 can receive query requests from the UE 101 (e.g., a client). The service interface 109 can determine whether the query includes a textual search. If the query includes a textual search, the service interface 109 can search for the text using one or more fields of one or more of the indexes 111. In certain embodiments, the query is forwarded to search the index 111 without a textual search. In other embodiments, the query is forwarded to the data service 115 to resolve query requests for one or more types of requests (e.g., a specific request for relational information based on a particular identifier in a particular table).

Figure 3:
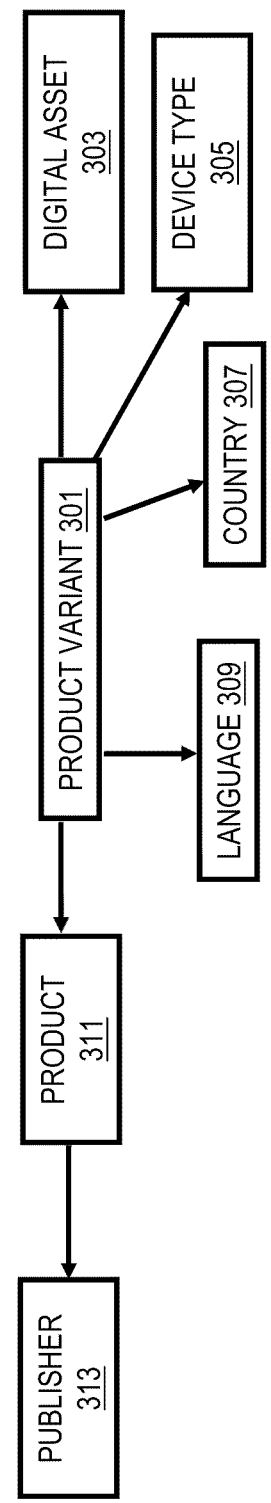
FIG. 3 is a diagram of an exemplary domain object model, according to one embodiment.

FIG. 3 is a diagram of an exemplary domain object model, according to one embodiment. The domain object model shows relationships between a product variant 301 and other objects such as a digital asset 303, device type 305, country 307, language 309, product 311, and publisher 313. As shown, the product variant 301 is directly related to digital asset 303, device type 305, country 307, language 309, and product 311. As such, a relational key can be used to link the product variant directly to the digital asset 303, device type 305, country 307, language 309, and product 311. Each of these objects can be represented using one or more tables in the relational database 107. Further, the publisher 313 data object can be related to the product variant 301 via the product 311 data object. In this manner, a publisher of a product is abstracted from the product variants of the product. Thus, a single change in value of a publisher for a product changes the value of the publisher for each of the product variants of the product. Further, the index 111 can include both first level relationships (e.g., the relationship of the product variant 301 to the product 311) as well as second level relationships (e.g., the relationship of the product variant 301 to the publisher 313). Additionally or alternatively, relationships between objects can be one to one (e.g., one product variant is associated with one country and/or language) or one-to-many (e.g., one product variant is associated with multiple countries and/or languages). It is noted that generally the one-to-many feature is technically difficult to implement in a flat table without multiple additional sets of information while retaining relationships. As such, it can be difficult for to create a searchable index that retains structural relationship information. However, the feature of including an object graph as an additional field can be used to store the structure while the search is performed on the searchable index.

Figure 4:
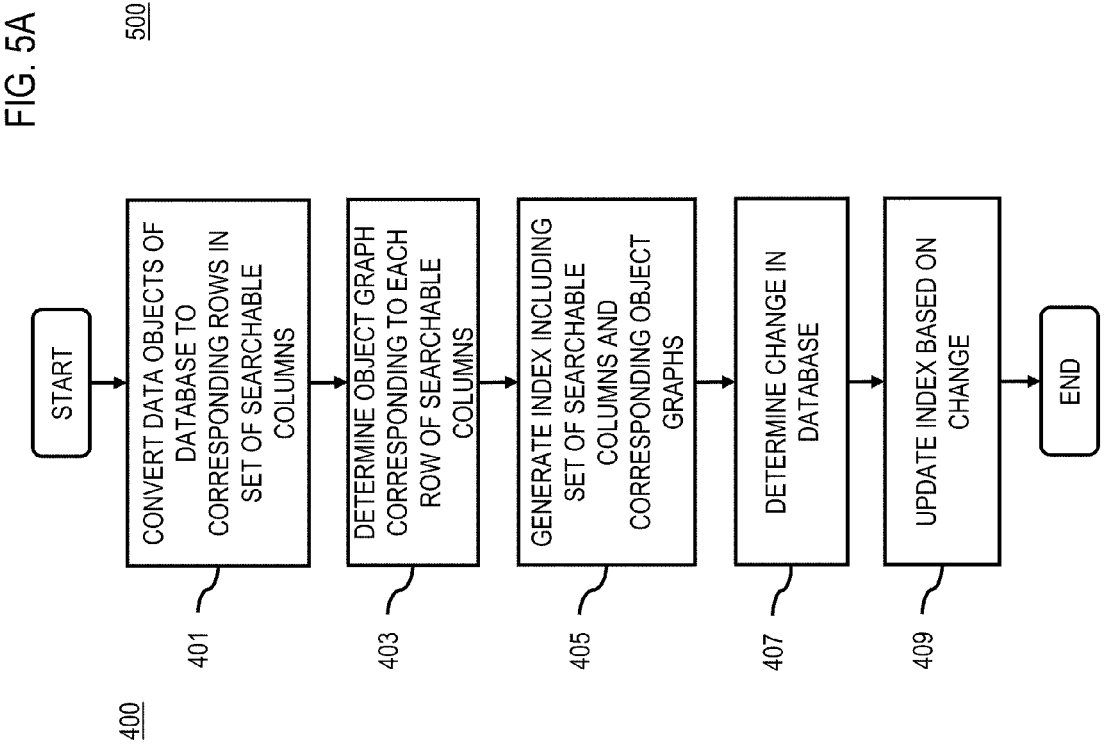
FIG. 4 is a flowchart of a process for generating a searchable index with associated object graphs, according to one embodiment.

FIG. 4 is a flowchart of a process for generating a searchable index with associated object graphs, according to one embodiment. In one embodiment, the execution module 205 performs the process 400 and is implemented in, for instance, a chip set including a processor and a memory as shown FIG. 7. Further, the execution module 205 and/or a component of the index builder 113 can provide the means for accomplishing various part of the process 400 as well as means for accomplishing other processes in conjunction with other components of the services platform 103. It is noted that the process 400 is described with respect to a relational database 107. However, other types of persistent storage such as an object oriented database are further considered and can be used to implement the process 400.

At step 401, the execution module 205 converts data objects of a database (e.g., the relational database 107) to corresponding rows in a set of searchable columns for inclusion in an index 111. The execution module 205 receives the one or more of the data objects from the data service 115 and/or relational database 107. By way of example, the data objects can be received based on a request from the execution module 205. As such, the execution module 205 uses an application programming interface (API) to communicate with the data service 115. The execution module 205 then parses the data objects and determines one or more fields of text corresponding to each data object to be included in one or more columns of a searchable index 111. Further, the execution module 205 determines an object graph corresponding to each row of the searchable columns (step 403). In the scenario that the data object has a one-to-many relationship with other data objects, each of the other data objects can be searched in the searchable columns, while the object graph stores the structural information associated with each of the other data objects.

The size and format of the tables used in the index 111 may be geared towards addressing a specific use case. As such the index 111 represents a set of tables or portions of tables in the relational database 107. For example, a table can exist to populate the front page of a browser application 117 requesting personalized services based on a type of the UE 101. As such, the page can depend on the type of UE 101, a country associated with the UE 101 or location of the user, and/or a language associated with the UE 101. A server of the front page can use one or more programming rules to request the table to populate information for the UE 101.

In one example, a row of the index 111 is generated according to a record in a particular table. The record includes one or more textual fields that are included in one or more columns of the searchable index 111. For example, a customer list may include a field for first name, a field for last name, and a field for address. In the index 111, each field can have a corresponding column and/or a column can include multiple fields. Further, the index 111 can include other records that have a relationship with the record. For example, a particular customer may be linked to one or more transactions in a transaction table based on one or more relationships (e.g., via a key). Thus, the execution module 205 can determine additional information corresponding to the record in records of other tables based on one or more relationships. The execution module 205 requests the table and adds the information in the table associated with the record to a field (e.g., either by appending to another field of the index 111 or adding another field to the index). In this manner, the rows are populated based, at least in part, on the determined additional information. Moreover, the relationship is added to the object graph. In certain embodiments, the object graph is also populated with corresponding information. In other embodiments, the object graph provides relationships between one or more searchable fields. In this manner, the searchable fields and the object graph can be used by a client application 117 to reconstruct the structure associated with the relational database 107.

Then, the index 111 is generated by the execution module 205 (step 405). The index 111 includes the set of searchable columns (e.g., the fields) and the corresponding object graphs. In certain embodiments, the generation of the index 111 includes serializing the object graph. Further, in some embodiments, the generation of the index 111 includes compressing the object graph. Compression of the object graph can be via one or more conventional approaches such as zipping the object graph. Further, the object graph (ether compressed or uncompressed) can be encoded in base 64. The client application 117 of the UE 101 can have one or more methods to decode and/or decompress the object graph.

Further, the execution module 205 can determine that a change has occurred in the relational database 107 (step 407). This may be based on information sent to the index builder 113 from the data service 115 and/or as part of a routine polling and synchronization process. Further, a part of conducting a transaction by the data service 115 that updates the relational database 107 can include causing, at least in part, sending of a message to the index builder 113 that the relational database 107 has changed.

When a change occurs in the relational database 107, the index 111 is updated (step 409). The index 111 can be updated by replacing the index 111 with a newly generated index based on the current information in the relational database 107. Further, the index 111 can be updated in a more targeted manner. With this approach, if a record or information associated with a record changes in the relational database 107, the record is flagged. A corresponding row to the record is then found in the index 111. Once found, the row is updated and/or replaced with the current information stored in the relational database 107 associated with the record.

Figure 5A:
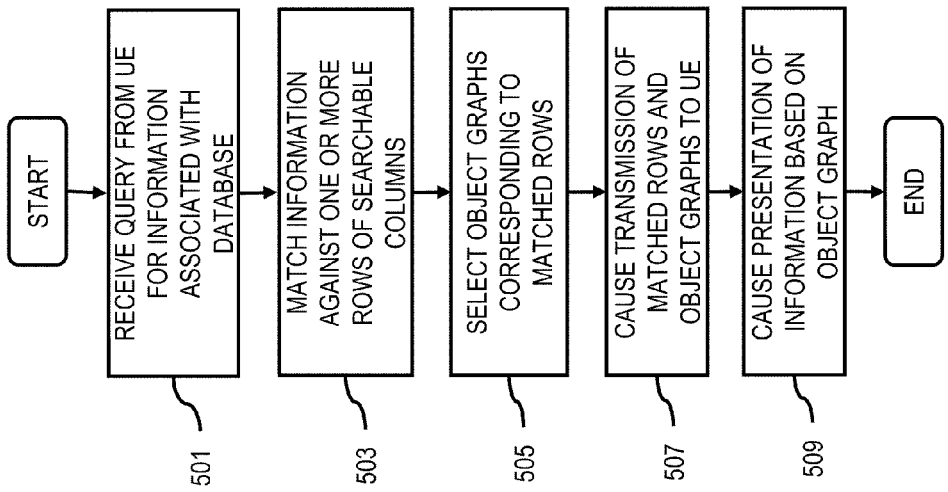
FIG. 5A is a flowchart of a process for answering a query based on a searchable index and associated object graphs, according to one embodiment.

FIG. 5A is a flowchart of a process for answering a query based on a searchable index and associated object graph, according to one embodiment. In one embodiment, the service interface 109 performs the process 500 and is implemented in, for instance, a chip set including a processor and a memory as shown FIG. 7. Further, the service interface 109 can provide the means for accomplishing various part of the process 500 as well as means for accomplishing other processes in conjunction with other components of the services platform 103. It is noted that the process 500 is described with respect to a relational database 107. However, other types of persistent storage such as an RDF based storage engine and/or an object oriented database are further considered and can be used to implement the process 500.

At step 501, the service interface 109 receives a query from a UE 101 for information associated with the relational database 107. The query is determined to be a search for information via one or more terms. The service interface 109 determines that the text based searches for the information should be searched for against one or more indexes 111 of the relational database 107. As such a corresponding index is retrieved from a memory.

The search terms are matched, at least in part, against one or more rows searchable columns of the index 111 (step 503). This can be done via one or more conventional methods such as using a Lucene library. Further, because the index 111 is stored with textual information in the searchable columns, the method of searching can be programming language independent. The result of the query can be one or more rows that match or match, at least in part, the terms and/or partial terms associated with the query. The one or more object graphs corresponding to the matched rows can then be selected for transmission to the requesting UE 101 (step 505). The object graphs can be selected as part of the search results. Then, the service interface 109 causes, at least in part, transmission of the matched rows and/or corresponding object graphs to the UE 101 (step 507).

Further, the service interface 109 can cause, at least in part, presentation of the information based on the object graph to a user of the UE 101 (step 509). The presentation can be caused by a signal sent by the service interface 109 (e.g., a signal including the matched rows and/or corresponding object graphs). Then, the UE 101 receives the information and reconstructs an instance of the relational database 107 associated with the requested information based on the object graph. As such, the UE 101 decompresses and/or un-serializes the corresponding object graph. In certain embodiments, the application 117 of the UE 101 requesting the information has coding allowing the application 117 to parse the object graph while retaining structural information in the relational database 107. As such, if a user of the application 117 changes information of the object graph and/or presented fields, the UE 101 can send a message to the service interface 109 notifying the service interface 109 about the modification.

The service interface 109 receives the update message from the UE 101. The service interface 109 then causes updating of the relational database 107 by generating a message to update the relational database 107 according to the message received from the UE 101. In certain embodiments, the message can be forwarded instead of generated. Then, the data service 115 receives the message and updates the relational database 107 according to the changed information received from the UE 101. The relational database 107 is able to be updated because the UE 101 has the structural information from the object graph to recreate an instance of the relational database 107. Further, the message can be specific to the location such as a table that needs to be updated and/or the corresponding records of the table to be updated. The location information can be included in the object graph, thus allowing the UE 101 to send the update message.

Figure 5B:
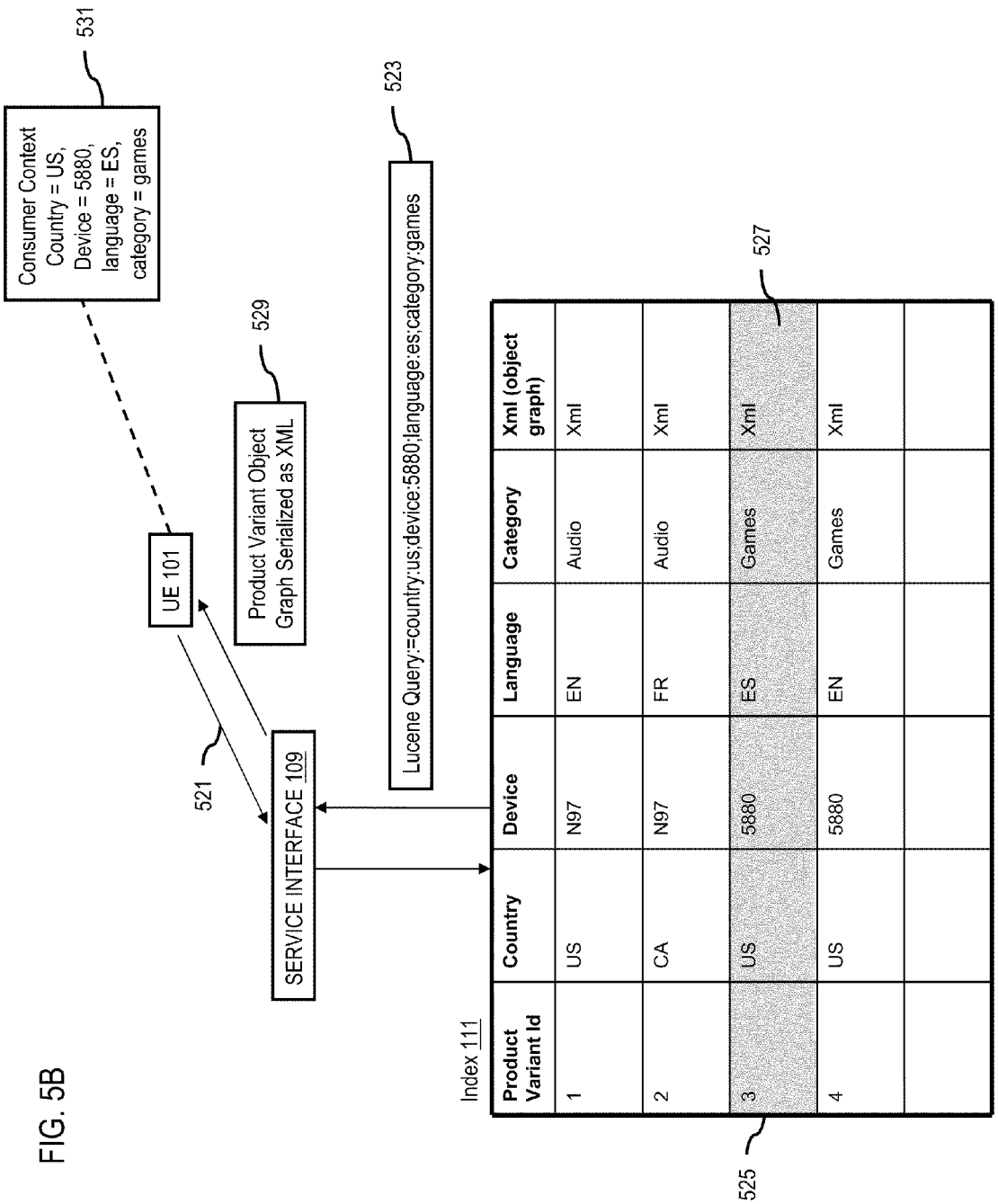
FIG. 5B is a flow diagram of utilizing an index to provide services to user equipment, according to one embodiment.

FIG. 5B is a flow diagram of utilizing an index to provide services to user equipment, according to one embodiment. The UE 101, at step 521, requests a list of products that match one or more parameters (e.g., country, device, language, category, etc.) from a service interface 109. The service interface 109 receives the query and causes a search of an index 111 (e.g., a Lucene index) based on a query 523 formulated based on the request from the UE 101. Because the information is indexed, the service interface 109 can retrieve the information via a text search. The service interface 109 determines that Product Variant 3 525 meets the criteria (e.g., based on the query 523). The service interface 109 then retrieves a serialized object graph 527 associated with the requested search (e.g., the object graph from the matching row) and returns the product variant object graph to the UE 101 (step 529). The UE 101 can then process the object graph (e.g., decode and/or decompress) and cause presentation 531 of the object graph to a user of the UE 101.

With the above approaches, a searchable index with corresponding object graphs is generated for a relational database 107. The searchable index provides for a manner to search the relational database 107 quickly while still retaining the structure of the relational database 107. In this manner, the backend processing at a services platform 103 is more robust and powerful, thus allowing for quicker searches of content stored in the relational database 107. The storage of the object graph with the searchable index further allows for the reconstruction of the structure of the relational database 107 at the UE 101. With this approach, an application 117 of the UE 101 is able to modify information associated with the relational database 107. Because the UE 101 has information from the object graph including the structure of the relational database 107 for the portion that the user wishes to modify, the user is able to modify the instance of the relational database 107 at a client application 117 and send an update message to update the relational database 107. Further, when the data service 115 managing the relational database 107 receives this message, the data service 115 can cause the index builder 113 to update the information in the index 111. Thus, the index 111 is additionally current. An advantage to this mechanism is to provide current information in the index 111.

The processes described herein for providing generation of an index including a set of searchable columns and corresponding object graphs for a database may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
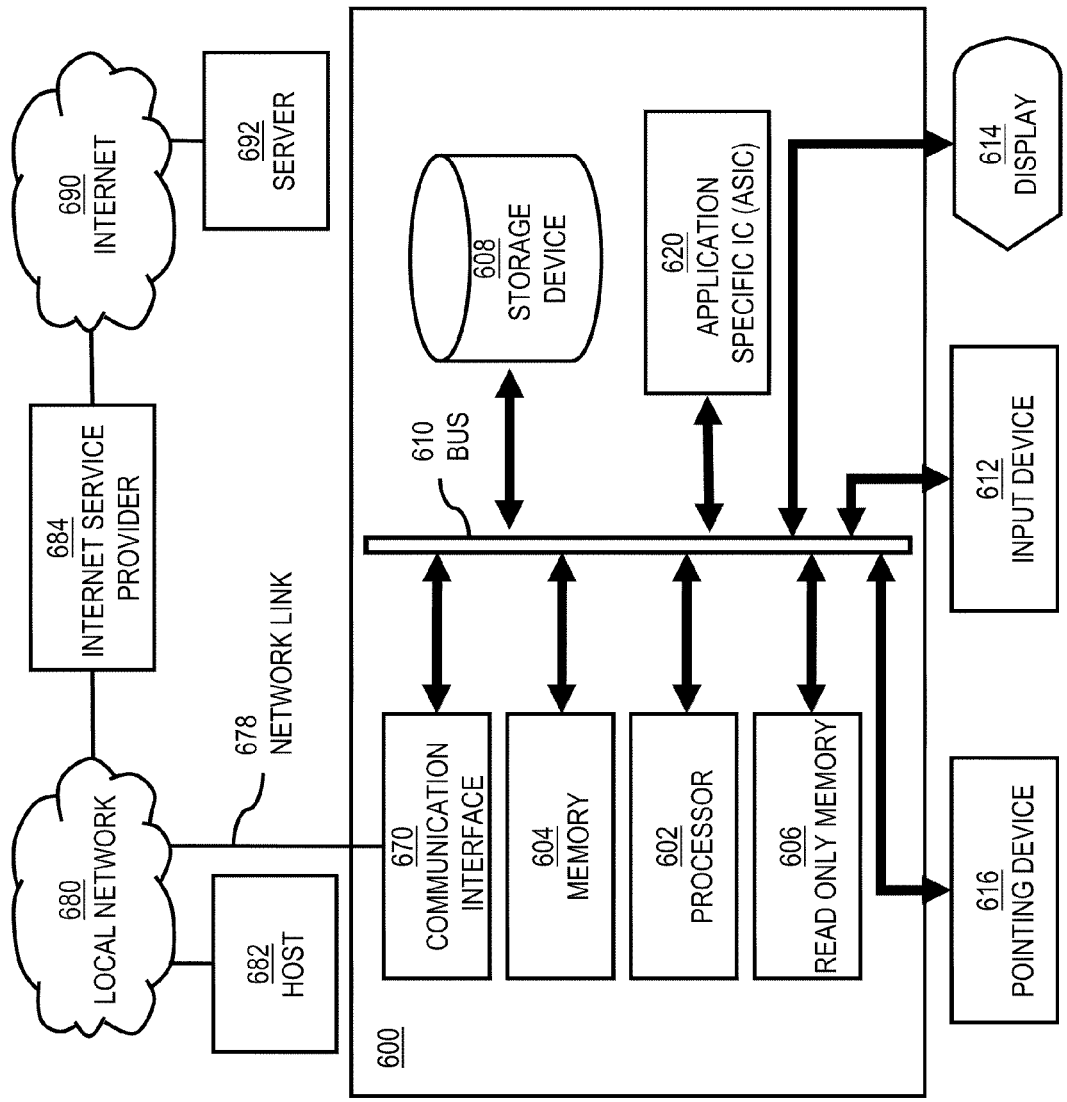
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate an index including a set of searchable columns and corresponding object graphs for a database as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating an index including a set of searchable columns and corresponding object graphs for a database.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generation of an index including a set of searchable columns and corresponding object graphs for a database. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for generating an index including a set of searchable columns and corresponding object graphs for a database. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generation of an index including a set of searchable columns and corresponding object graphs for a database, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for the UE 101 and services platform 103.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
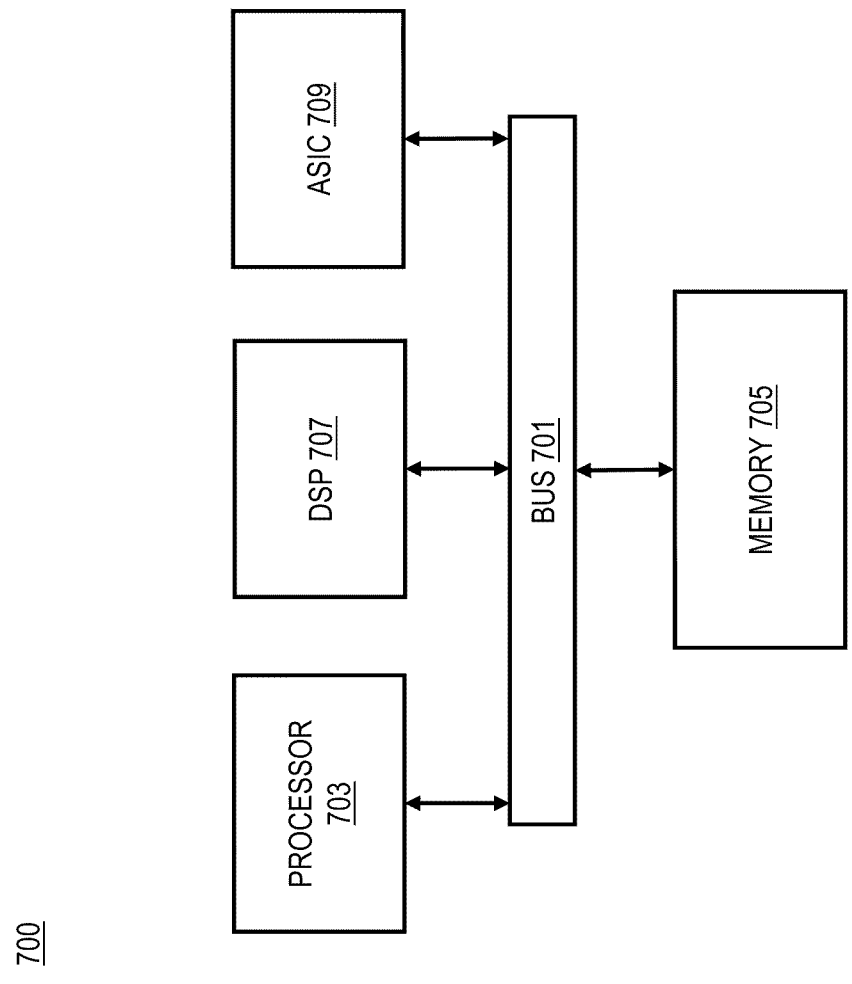
FIG. 7 is a diagram of a chip set that can be used to implement an embodiment of the invention.

FIG. 7 illustrates a chip set or chip 700 upon which an embodiment of the invention may be implemented. Chip set 700 is programmed to generate an index including a set of searchable columns and corresponding object graphs for a database as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of generating an index including a set of searchable columns and corresponding object graphs for a database.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate an index including a set of searchable columns and corresponding object graphs for a database. The memory 705 also stores the data associated with or generated by the execution of the inventive steps.

Figure 8:
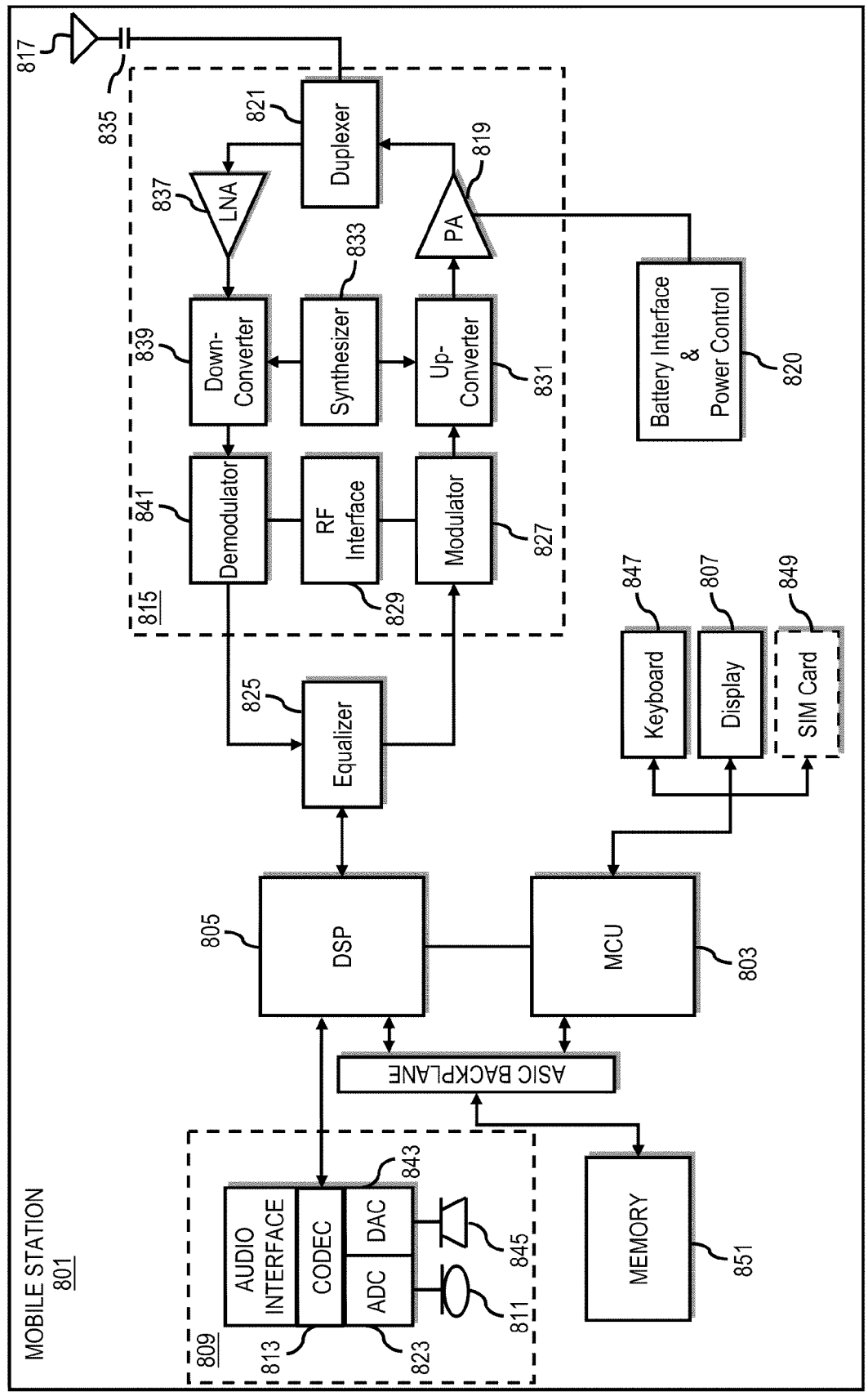
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of causing searches of database related information and receiving and updating the information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of causing searches of database related information and receiving and updating the information. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to cause searches of database related information and receiving and updating the information. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
converting a plurality of data objects of a database to corresponding rows in a set of searchable columns;
generating an object graph corresponding to each row of the searchable columns; and
generating an index including the set of searchable columns and the corresponding object graphs.

2. A method of claim 1, further comprising:
determining one or more relationships between one of the data objects and one or more other data objects in the database,
wherein the object graph corresponding to the one data object includes a representation of the relationships.

3. A method of claim 1, further comprising:
receiving a query from a device for information associated with the database;
matching, at least in part, the information against one or more rows of the searchable columns;
selecting the objects graphs corresponding to the matched rows; and
causing, at least in part, transmission of the matched rows and the corresponding object graphs to the device.

4. A method of claim 3, further comprising:
receiving a request to update the database based, at least in part on the corresponding object graphs transmitted to the device; and
causing updating of the database according to the request.

5. A method of claim 1, further comprising:
determining that a change has occurred in the database; and
updating the index based on the change.

6. A method of claim 1, wherein the database is a relational database that includes tables of records and wherein the respective data objects include respective records and the index is associated with a particular table.

7. A method of claim 6, further comprising:
populating the corresponding rows based, at least in part, on the records of the particular table;
determining additional information corresponding to the records in other tables based on one or more relationships; and
populating the corresponding rows based, at least in part, on the additional information.

8. A method of claim 1, wherein the object graph is encoded in a markup language and serialized and wherein the object graph is compressed.

9. An apparatus comprising:
at least one processor; and
at least one memory including computer program code,
the at least one memory and the computer program code configured to, with the at least one processor, cause the apparatus to perform at least the following,
convert a plurality of data objects of a database to corresponding rows in a set of searchable columns;
generate an object graph corresponding to each row of the searchable columns; and
generate an index including the set of searchable columns and the corresponding object graphs.

10. An apparatus of claim 9, wherein the apparatus is further caused to:
determine one or more relationships between one of the data objects and one or more other data objects in the database,
wherein the object graph corresponding to the one data object includes a representation of the relationships.

11. An apparatus of claim 10, wherein the apparatus is further caused to:
receive a query from a device for information associated with the database;
match, at least in part, the information against one or more rows of the searchable columns;
select the objects graphs corresponding to the matched rows; and
cause, at least in part, transmission of the matched rows and the corresponding object graphs to the device.

12. An apparatus of claim 11, wherein the apparatus is further caused to:
receive request to update the database based, at least in part on the corresponding object graphs transmitted to the device; and
cause updating of the database according to the request.

13. An apparatus of claim 9, wherein the apparatus is further caused to:
determine that a change has occurred in the database; and
update the index based on the change.

14. An apparatus of claim 9, wherein the database is a relational database that includes tables of records and wherein the respective data objects include respective records and the index is associated with a particular table.

15. An apparatus of claim 14, wherein the apparatus is further caused to:
populate the corresponding rows based, at least in part, on the records of the particular table;
determine additional information corresponding to the records in other tables based on one or more relationships; and
populate the corresponding rows based, at least in part, on the additional information.

16. An apparatus of claim 9, wherein the object graph is encoded in a markup language and serialized and wherein the object graph is compressed.

17. A computer-readable storage medium carrying one or more sequences of one or more instructions which, when executed by one or more processors, cause an apparatus to at least perform the following steps:

converting a plurality of data objects of a database to corresponding rows in a set of searchable columns;

generating an object graph corresponding to each row of the searchable columns; and generating an index including the set of searchable columns and the corresponding object graphs.

18. A computer-readable storage medium of claim 17, wherein the apparatus is caused to further perform:

determining one or more relationships between one of the data objects and one or more other data objects in the database, wherein the object graph corresponding to the one data object includes a representation of the relationships.

19. A computer-readable storage medium of claim 17, wherein the apparatus is caused to further perform:

receiving a query from a device for information associated with the database;

matching, at least in part, the information against one or more rows of the searchable columns;

selecting the objects graphs corresponding to the matched rows; and causing, at least in part, transmission of the matched rows and the corresponding object graphs to the device.

20. A computer-readable storage medium of claim 19, wherein the apparatus is caused to further perform:

receiving a request to update the database based, at least in part on the corresponding object graphs transmitted to the device; and causing updating of the database according to the request.

\* \* \* \* \*